United States Patent [19]

Watanabe

[11] Patent Number: 5,715,250
[45] Date of Patent: Feb. 3, 1998

[54] ATM-LAN CONNECTION APPARATUS OF A SMALL SCALE CAPABLE OF CONNECTING TERMINALS OF DIFFERENT PROTOCOL STANDARDS AND ATM-LAN INCLUDING THE ATM-LAN CONNECTION APPARATUS

[75] Inventor: Ayumi Watanabe, Tokyo, Japan

[73] Assignee: NEC Corporation, Tokyo, Japan

[21] Appl. No.: 623,818

[22] Filed: Mar. 29, 1996

[30] Foreign Application Priority Data

Mar. 31, 1995 [JP] Japan .................................. 7-075614

[51] Int. Cl.[6] ........................................ H04L 12/66
[52] U.S. Cl. ........................ 370/395; 370/401; 370/466; 370/905
[58] Field of Search ............................ 370/395, 397, 370/398, 399, 402, 420, 466, 409, 903, 905, 401

[56] References Cited

U.S. PATENT DOCUMENTS 5,600,633  2/1997  Jaisingh et al. .................. 370/395
5,610,905  3/1997  Murthy et al. .................... 370/466

*Primary Examiner*—Benedict V. Safourek
*Attorney, Agent, or Firm*—Whitham, Curtis, Whitham & McGinn

[57] ABSTRACT

An Asynchronous Transfer Mode-Local Area Network (ATM-LAN) connection apparatus is connected between an ATM terminal of a LAN emulation protocol and an ATM switch connected to ATM terminals of an Internet Protocol (IP) over ATM protocol. The ATM-LAN connection apparatus includes ATM physical layer sections for transmission and reception of an ATM cell, AAL5-SAR sections for reassembly and segmentation of an AAL5 packet, a LAN emulation protocol processing section for performing minimum LAN emulation protocol processing with respect to the specific ATM terminal, an IP over ATM protocol processing section, and a bridging section for frame format conversion between both the protocols.

4 Claims, 4 Drawing Sheets

ARP TABLE 20

| IP ADDRESS | MAC ADDRESS |
|---|---|
| ip4 | mac1 |
| ip5 | mac1 |
| ip6 | mac1 |
| ⋮ | ⋮ |

VC TABLE 21

| VC | ATM ADDRESS |
|---|---|
| vc0 | × |
| vc1 | atm1 |
| ⋮ | ⋮ |

FIG. 3

VC TABLE 14

| VC | ATM ADDRESS |
|---|---|
| vc1 | atm2 |
| ⋮ | ⋮ |
| ⋮ | ⋮ |
| ⋮ | ⋮ |

VC TABLE 18

| IP ADDRESS | ATM ADDRESS | VC |
|---|---|---|
| ip4 | atm4 | vc4 |
| ip5 | atm5 | vc5 |
| ip6 | atm6 | vc6 |
| ⋮ | ⋮ | ⋮ |

FIG. 4

ATM-LAN CONNECTION APPARATUS OF A SMALL SCALE CAPABLE OF CONNECTING TERMINALS OF DIFFERENT PROTOCOL STANDARDS AND ATM-LAN INCLUDING THE ATM-LAN CONNECTION APPARATUS

BACKGROUND OF THE INVENTION

This invention relates to an ATM-LAN (Asynchronous Transfer Mode Local Area Network) comprising a first AT terminal of a LAN emulation protocol standard, a plurality of second ATM terminals of an IP (Internet Protocol) over ATM protocol standard, an ATM switch connected to the second ATM terminals, and an ATM-LAN connection apparatus connected between the first ATM terminal and the ATM switch and, in particular, to the ATM-LAN connection apparatus.

In order to directly couple a terminal to an ATM-LAN, the terminal is generally equipped with an ATM adapter card (or an ATM board). A standard of connection between an existing protocol and the ATM-LAN is installed in the ATM adapter card. As such a standard, use is presently made of an IP over ATM protocol and a LAN emulation protocol.

The IP over ATM protocol is set forth in IETF (Internet Engineering Task Force), RFC (Request for Comment) 1577 and adopts a direct linkage between an IP layer and an ATM network. On the other hand, the LAN emulation protocol is such that an ethernet/token-ring packet is bridged over the ATM network by the use of an encapsulation bridge technique.

Presently, the IP over ATM protocol and the LAN emulation protocol are concurrently used in the ATM-LAN.

In the present status, a first ATM terminal of the LAN emulation protocol and a second ATM terminal of the IP over ATM protocol are concurrently used in the same ATM-LAN. In addition, a common TCP (Transmission Control Protocol)/IP is used by both the first and the second ATM terminals. However, mutual communication between the first and the second ATM terminals is impossible because of the different protocols. For communication between the first and second ATM terminals, it is required to use a large-scale router having dual functions for the IP over ATM protocol and the LAN emulation protocol.

SUMMARY OF THE INVENTION

It is therefore an object of this invention to provide a small-scale ATM-LAN connection apparatus which enables communication between first and second ATM terminals of different standards (namely, the first ATM terminal of a LAN emulation protocol and the second ATM terminal of an IP over ATM protocol).

It is another object of this invention to provide an ATM-LAN including a small-scale ATM-LAN connection apparatus which enables communication between a first ATM terminal of a LAN emulation protocol and a second ATM terminal of an IP over ATM protocol.

An ATM-LAN connection apparatus to which this invention is applicable is for use in an ATM-LAN comprising a first ATM terminal of a LAN emulation protocol, a plurality of second ATM terminals of an IP over ATM protocol, and an ATM switch connected to the second ATM terminals and is connected between the first ATM terminal and the ATM switch. According to this invention, the ATM-LAN connection apparatus comprises a first ATM physical layer section connected to the first ATM terminal for receiving as a first reception cell a first ATM cell supplied from the first ATM terminal; a first AAL5-SAR (ATM Adaptation Layer type 5—Segmentation And Reassembly) section for reassembling the first reception cell into a first AAL5 packet to output the first AAL5 packet as a first LAN emulation frame; a LAN emulation protocol processing section for processing the first LAN emulation frame into a first processed LAN emulation frame; a bridging section for converting the first processed LAN emulation frame into a first IP over ATM frame; an IP over ATM protocol processing section for processing the first IP over ATM frame into a first processed IP over ATM frame; a second AAL5-SAR section connected to the ATM switch for receiving the first AAL5 packet extracted from the first processed IP over ATM frame to segment the first AAL5 packet into the first ATM cell; and a second ATM physical layer section for transmitting as a first transmission cell the first ATM cell to the ATM switch. The second ATM physical layer section is also for receiving as a second reception cell a second ATM cell supplied from the ATM switch. The second AAL5-SAR section is also for reassembling the second reception cell into a second AAL5 packet to output the second AAL5 packet as a second IP over ATM frame. The IP over ATM protocol processing section is also for processing the second IP over ATM frame into a second processed IP over ATM frame. The bridging section is also for converting the second processed IP over ATM frame into a second LAN emulation frame. The LAN emulation protocol processing section is also for processing the second LAN emulation frame into a second processed LAN emulation frame. The first AAL5-SAR section is also for receiving the second AAL5 packet extracted from the second processed IP over ATM frame to segment the second AAL5 packet into the second ATM cell. The first ATM physical layer section is also for transmitting as a second transmission cell the second ATM cell to the first ATM terminal.

An ATM-LAN to which this invention is applicable comprises a first ATM terminal of a LAN emulation protocol, a plurality of second ATM terminals of an IP over ATM protocol, an ATM switch connected to the second ATM terminals, and an ATM-LAN connection apparatus connected between the first ATM terminal and the ATM switch. According to this invention, the ATM-LAN connection apparatus comprises a first ATM physical layer section connected to the first ATM terminal for receiving as a first reception cell a first ATM cell supplied from the first ATM terminal; a first AAL5-SAR section for reassembling the first reception cell into a first AAL5 packet to output the first AAL5 packet as a first LAN emulation frame; a LAN emulation protocol processing section for processing the first LAN emulation frame into a first processed LAN emulation frame; a bridging section for converting the first processed LAN emulation frame into a first IP over ATM frame; an IP over ATM protocol processing section for processing the first IP over ATM frame into a first processed IP over ATM frame; a second AAL5-SAR section connected to the ATM switch for receiving the first AAL5 packet extracted from the first processed IP over ATM frame to segment the first AAL5 packet into the first ATM cell, and a second ATM physical layer section for transmitting as a first transmission cell the first ATM cell to the ATM switch. The second ATM physical layer section is also for receiving as a second reception cell a second ATM cell supplied from the ATM switch. The second AAL5-SAR section is also for reassembling the second reception cell into a second AAL5 packet to output the second AAL5 packet as a second IP over ATM frame. The IP over ATM protocol processing section is also for processing the second IP over ATM frame into a second processed IP over ATM frame. The bridging section is also for converting the second processed IP over ATM frame into a second LAN emulation frame. The LAN emulation protocol processing section is also for processing the second LAN emulation frame into a second processed LAN emulation frame. The first AAL5-SAR section is also for receiving the second AAL5 packet extracted from the second processed IP over ATM frame to segment the second AAL5 packet into the second ATM cell. The first ATM physical layer section is also for transmitting as a second transmission cell the second ATM cell to the first ATM terminal.

BRIEF DESCRIPTION OF THE DRAWING

FIG. 3 is a view for describing a table stored in a first ATM terminal in the ATM-LAN illustrated in FIG. 1;

FIG. 4 is a view for describing a table stored in the ATM-LAN connection apparatus illustrated in FIG. 2;

DESCRIPTION OF THE PREFERRED EMBODIMENTS

Figure 1:
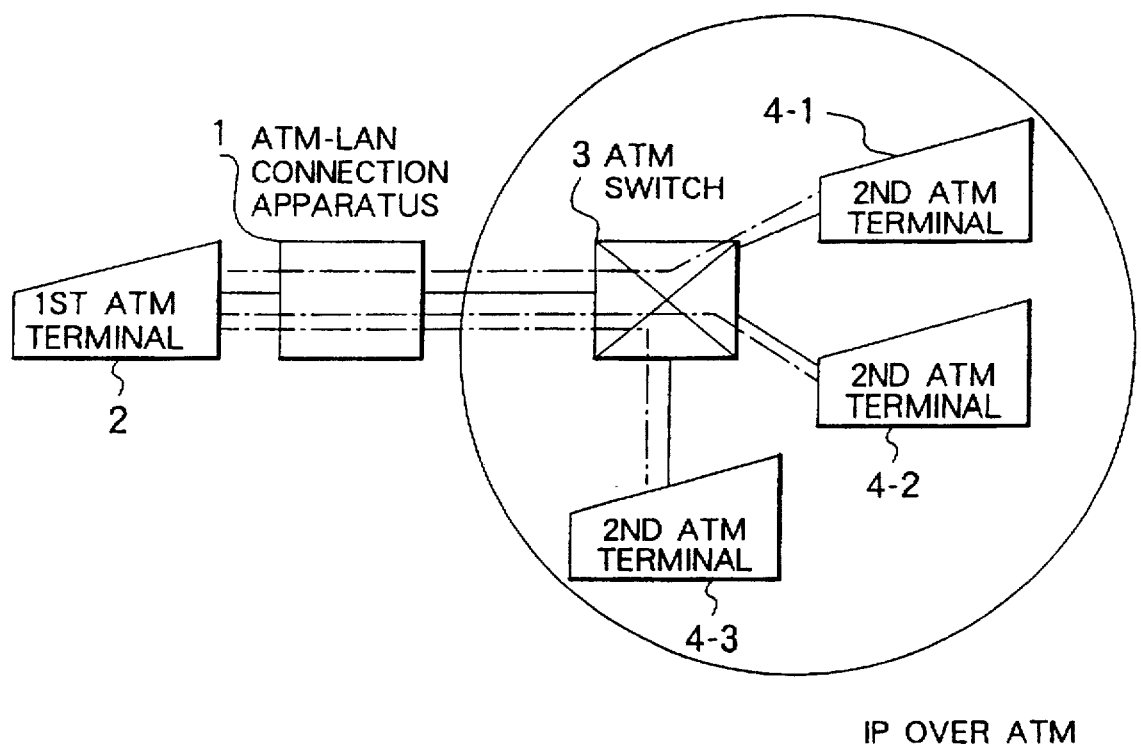
FIG. 1 is a block diagram of an ATM-LAN including an ATM-LAN connection apparatus according to one embodiment of this invention.

Description will now be made as regards an embodiment of this invention with reference to the drawing.

Referring to FIG. 1, an ATM-LAN according to one embodiment of this invention comprises an ATM-LAN connection apparatus 1 and a first ATM terminal 2 of a LAN emulation protocol. In other words, the first ATM terminal 2 is a LAN emulation client (LEC) terminal. The ATM-LAN connection apparatus 1 is connected to the first ATM terminal 2. The first ATM terminal 2 and the ATM-LAN connection apparatus 2 are operable in accordance with the LAN emulation protocol. The ATM-LAN connection apparatus 1 is connected also to an ATM switch 3.

A plurality of second ATM terminals 4-1, 4-2, and 4-3 of an IP over ATM protocol are connected to the ATM switch 3, respectively. Thus, the second ATM terminals 4-1, 4-2, and 4-3 are connected through the ATM switch 3 to the ATM-LAN connection apparatus 1. The ATM-LAN connection apparatus 1 has such a function that enables communication between the first ATM terminal 2 and the second ATM terminals 4-1 through 4-3 as will later be described. Data communication routes between the first ATM terminal 2 and the second ATM terminals 4-1 through 4-3 are depicted by dash-and-dot lines in the figure.

Figure 2:
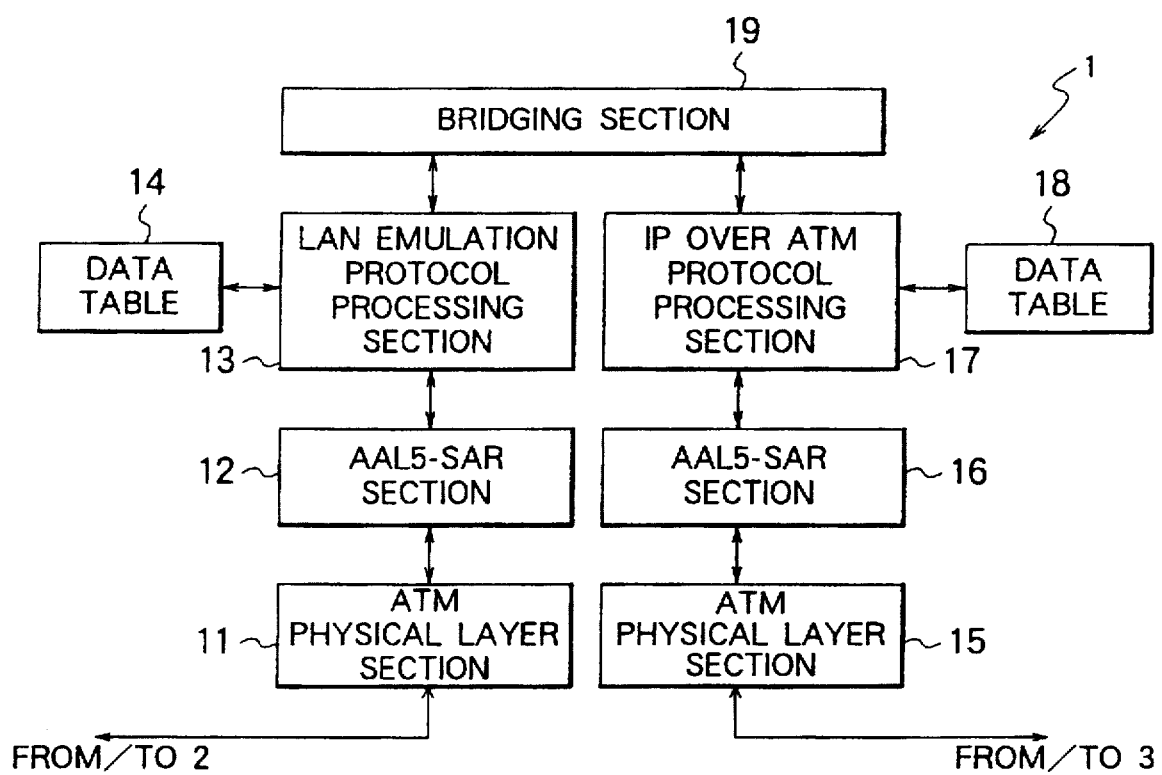
FIG. 2 is a block diagram of the ATM-LAN connection apparatus illustrated in FIG. 1.

Referring to FIG. 2, the ATM-LAN connection apparatus 1 comprises a first ATM physical layer section (ATM-PHY) 11 for transmission and reception of an ATM cell between the ATM-LAN connection apparatus 1 and the first ATM terminal 2. A first AAL5-SAR section 12 carries out segmentation and reassembly of an AAL5 packet. A LAN emulation protocol processing section 13 provides a LAN emulation function restricted between the first ATM terminal 2 and the ATM-LAN connection apparatus 1. A first data table 14 stores reference data referred to by the LAN emulation protocol processing section 13.

A second ATM physical layer section (ATM-PHY) 15 is for transmission and reception of an ATM cell between the ATM-LAN connection apparatus 1 and the ATM switch 3. A second AAL5-SAR section 16 carries out segmentation and reassembly of an AAL5 packet. An IP over ATM protocol processing section 17 provides an IP over ATM protocol function using permanent virtual circuits (PVC) between the ATM-LAN connection apparatus 1 and the second ATM terminals 4-1 through 4-3 (FIG. 1) connected to the ATM switch 3. A second data table 18 stores reference data referred to by the IP over ATM protocol processing section 17.

A bridging section 19 is for carrying out frame format conversion between a LAN emulation frame and an IP over ATM frame by the use of a fixed value so as to enable data communication between the LAN emulation protocol processing section 13 and the IP over ATM protocol processing section 17.

Referring to FIGS. 3 through 6 in addition to FIGS. 1 and 2, an operation of the ATM-LAN illustrated in FIG. 1 will be described. Herein, description is directed to the case where communication is carried out between the first ATM terminal 2 and the second ATM terminal 4-1.

Figures 5, 6:
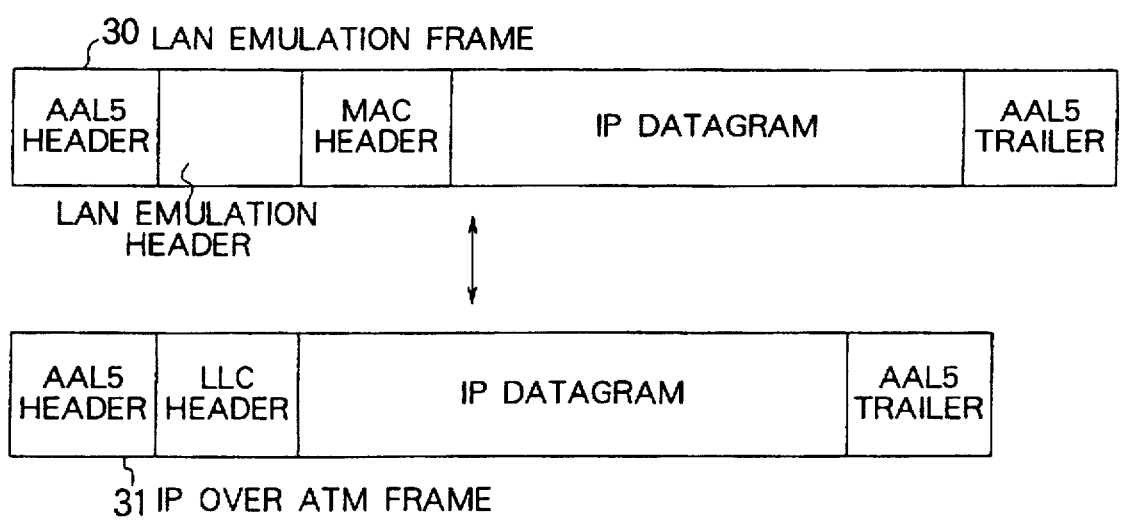
FIG. 5 is a view for describing a table stored in a second ATM terminal in the ATM-LAN illustrated in FIG. 1.
FIG. 6 is a view for describing an operation of the ATM-LAN connection apparatus illustrated in FIG. 2.

FIGS. 3 through 6 show various tables which must be set up prior to start of communication. FIG. 3 shows an ARP (Address Resolution Protocol) table 20 and a VC (Virtual Channel) table 21 to be stored in the first ATM terminal 2. FIG. 4 shows VC tables (namely, data tables) 14 and 18 to be stored in the ATM-LAN connection apparatus 1. FIG. 5 shows a VC table 22 to be stored in the second ATM terminal 4-1. It is noted here that an ATM address atm1 for a virtual channel vc1 in the VC table 21 (FIG. 3) is determined during execution of the LAN emulation protocol.

FIG. 6 shows a LAN emulation frame 30 and an IP over ATM frame 31 of an AAL-SDU (Service Data Unit) of an AAL5 layer in the ATM-LAN connection apparatus 1.

Consideration will at first be made about transmission from the first ATM terminal 2 to the second ATM terminal 4-1. In this event, the first ATM terminal 2 searches the ARP table 20 in FIG. 3 with reference to an IP address ip4 of transmission data to acquire a MAC (Media Access Control) address mac1 corresponding to the IP address ip4. It is noted here that the MAC address mac1 is assigned to the ATM-LAN connection apparatus 1. As seen from FIG. 3, the MAC address mac1 is made to correspond to all IP addresses ip4, ip5, ip6, . . . in the ARP table 20. Thus, whichever one of the IP addresses ip4, ip5, ip6, . . . is selected as a destination IP address, transmission is directed to the ATM-LAN connection apparatus 1 which is assigned with the MAC address mac1.

Then, the first ATM terminal 2 carries out LAN emulation protocol processing. Specifically, the first ATM terminal 2 transmits to the ATM-LAN connection apparatus 1 an address resolution request frame to resolve the ATM address from the MAC address in order to establish a data transfer virtual channel. It is noted here that the address resolution request frame is transmitted through an address resolution virtual channel vc0 preliminarily set up in the VC table 21 in FIG. 3. The LAN emulation frame 30 as illustrated in FIG. 6 is reassembled by the use of the MAC address mac1 and is transmitted as the address resolution request frame. The LAN emulation frame 30 comprises an AAL5 header field, a LAN emulation header field, a MAC header field, an IP datagram field, and an AAL5 trailer field. Address resolution request data are contained in the IP datagram field.

Supplied with the address resolution request frame, the LAN emulation protocol processing section 13 of the ATM-LAN connection apparatus 1 returns an ATM address atm1 assigned to the ATM-LAN connection apparatus 1 and transmits a response frame through the same address resolution virtual channel vc0 with an AAL5 header added.

Supplied with the response frame, the first ATM terminal 2 searches the VC table 21 (FIG. 3) with reference to the ATM address atm1 extracted from the response frame to acquire a virtual channel vc1 corresponding to the ATM address atm1. Since a PVC (Permanent Virtual Circuit) is used, the virtual channel vc1 corresponding to the ATM address atm1 is already set up.

Thus, the data transfer virtual channel is found. By the use of the MAC address mac1 of the ATM-LAN connection apparatus 1, a MAC header is added to the transmission data which are encapsulated into the LAN emulation frame. By the use of the virtual channel vc1, the AAL5 header is added to the transmission data which are then transmitted to the ATM-LAN connection apparatus 1.

The ATM-LAN connection apparatus 1 receives in the first ATM physical layer section 11 the ATM cell transmitted form the first ATM terminal 2. The first AAL-5-SAR section 12 carries out segmentation and reassembly of the ATM cell. At this time, the AAL5-SAR section 12 converts the ATM cell as received into the LAN emulation frame (30 in FIG. 6) which is delivered to the LAN emulation protocol processing section 13. The LAN emulation protocol processing section 13 delivers the LAN emulation frame to the bridging section 19. The bridging section 19 refers to a protocol ID (IDentification) code of the MAC header and discards the LAN emulation frame unless the protocol ID code indicates the IP. If the IP is indicated, the bridging section 19 deletes the LAN emulation header and the MAC header of the LAN emulation frame and adds a LLC (Logical Link Control) header by the use of a fixed value. Thus, the LAN emulation frame is converted into the IP over ATM frame. Supplied with the IP over ATM frame from the bridging section 19, the IP over ATM protocol processing section 17 searches the VC table (data table) 18 in FIG. 4 with reference to the destination IP address ip4 in the IP datagram to acquire a virtual channel vc4 corresponding to the IP address ip4. The AAL5 header is added to the IP over ATM frame by the use of the virtual channel vc4. Thus, the IP over ATM frame has such a format depicted at 31 in FIG. 6. The IP over ATM frame is delivered to the second AAL5-SAR section 16. The AAL5-SAR section 16 segments the IP over ATM frame into the ATM cell. The second ATM physical layer section 15 transmits the ATM cell to the ATM switch 3.

The ATM switch 3 identifies a port of the virtual channel vc4 with reference to a VC value of the AAL5 header and switches the frame to the port. Thus, the data finally reach the second ATM terminal 4-1.

Now, consideration will be directed to transmission from the second ATM terminal 4-1 to the first ATM terminal 2. The second ATM terminal 4-1 searches the VC table 22 (FIG. 5) with reference to an IP address ip1 of the transmission data to acquire the virtual channel vc4 corresponding to the IP address ip1. By the use of the virtual channel vc4, the AAL5 header is added to the transmission data which are then transmitted to the ATM switch 3.

The ATM switch 3 identifies a port of the virtual channel vc4 with reference to a VC value of the AAL5 header and switches the frame to the ATM-LAN connection apparatus 1.

In the manner similar to data reception from the first ATM terminal 2, the ATM-LAN connection apparatus 1 receives in the second ATM physical layer section 15 the ATM cell from the ATM switch 3. The second AAL5-SAR section 16 reassembles the IP over ATM frame of a format depicted at 31 in FIG. 6 and delivers the IP over ATM frame to the IP over ATM protocol processing section 17. The IP over ATM protocol processing section 17 delivers the IP over ATM frame to the bridging section 19. The bridging section 19 deletes the header from the IP over ATM frame and adds the MAC header by the use of a fixed value mac2 for encapsulation into the LAN emulation frame. The LAN emulation frame is delivered to the LAN emulation protocol processing section 13. The fixed value mac2 represents a MAC address of the first ATM terminal 2 that is preliminarily set up. The LAN emulation protocol processing section 13 refers to the VC table (data table) 14 (FIG. 4) to acquire the data transfer virtual channel vc1 to prepare the AAL5 header. Through the first AAL5-SAR section 12 and the first ATM physical layer section 11, the data finally reach the first ATM terminal 2.

By the above-mentioned operation, communication between the first ATM terminal 2 and the second ATM terminal 4-1 is enabled.

As described above, the ATM-LAN connection apparatus according to this invention comprises the first and the second ATM physical layer sections for transmission and reception of the ATM cell, the first and the second AAL5-SAR sections for reassembling the ATM cell into the AAL5 packet and for segmenting the AAL5 packet into the ATM cell, the IP over ATM protocol processing section, the LAN emulation protocol processing section, and the bridging section for frame format conversion. The first ATM terminal of the LAN emulation protocol, which can not directly communicate with the second ATM terminal of the IP over ATM protocol, is connected through the ATM-LAN connection apparatus to the ATM switch in the ATM-LAN. With this structure, communication between those terminals of the different protocols is enabled without using a large-scale router.

In addition, the LAN emulation function in the ATM-LAN connection apparatus is such a processing that is restricted between the first ATM terminal of the LAN emulation protocol and the ATM-LAN connection apparatus. Frame format conversion is easy because the fixed value is used for all frames. Accordingly, the ATM-LAN connection apparatus can be realized in a small scale.

What is claimed is:

1. An Asynchronous Transfer Mode-Local Area Network (ATM-LAN) connection apparatus which is for use in an ATM-LAN, said ATM-LAN comprising a first ATM terminal of a LAN emulation protocol, a plurality of second ATM terminals of an Internet Protocol (IP) over ATM protocol, an ATM switch connected to said second ATM terminals, and said ATM-LAN connection apparatus connected between said first ATM terminal and said ATM switch, said ATM-LAN connection apparatus comprising:

a first ATM physical layer section connected to said first ATM terminal for receiving as a first reception cell a first ATM cell supplied from said first ATM terminal;

a first AAL5-SAR (ATM Adaptation Layer type 5-Segmentation And Reassembly) section for reassembling said first reception cell into a first AAL5 packet to output said first AAL5 packet as a first LAN emulation frame;

a LAN emulation protocol processing section for processing said first LAN emulation frame into a first processed LAN emulation frame;

a bridging section for converting said first processed LAN emulation frame into a first IP over ATM frame;

an IP over ATM protocol processing section for processing said first IP over ATM frame into a first processed IP over ATM frame;

a second AAL5-SAR section connected to said ATM switch for receiving said first AAL5 packet extracted from said first processed IP over ATM frame to segment said first AAL5 packet into said first ATM cell; and a second ATM physical layer section for transmitting as a first transmission cell said first ATM cell to said ATM switch, said second ATM physical layer section being also for receiving as a second reception cell a second ATM cell supplied from said ATM switch; said second AAL5-SAR section being also for reassembling said second reception cell into a second AAL5 packet to output said second AAL5 packet as a second said IP over ATM protocol processing section being also for processing said second IP over ATM frame into a second processed IP over ATM frame, said bridging section being also for converting said second processed IP over ATM frame into a second LAN emulation frame;

said LAN emulation protocol processing section being also for processing said second LAN emulation frame into a second processed LAN emulation frame, said first AAL5-SAR section being also for receiving said second AAL5 packet extracted from said second processed IP over ATM frame to segment said second AAL5 packet into said second ATM cell, and said first ATM physical layer section being also for transmitting as a second transmission cell said second ATM cell to said first ATM terminal.

2. An ATM-LAN connection apparatus as claimed in claim 1, further comprising:

a first data table which stores first data to be referred to by said LAN emulation protocol processing section;

a second data table which stores second data to be referred to by said IP over ATM protocol processing section;

said LAN emulation protocol processing section processing said first LAN emulation frame into said first processed LAN emulation frame with reference to said first data table and processing said second LAN emulation frame into said second processed LAN emulation frame with reference to said first data table;

said IP over ATM protocol processing section processing said first IP over ATM frame into said first processed IP over ATM frame with reference to said second data table and processing said second IP over ATM frame into said second processed IP over ATM frame with reference to said second data table.

3. An Asynchronous Transfer Mode-Local Area Network (ATM-LAN) comprising a first ATM terminal of a LAN emulation protocol, a plurality of second ATM terminals of an Internet Protocol (IP) over ATM protocol, an ATM switch connected to said second ATM terminals, and an ATM-LAN connection apparatus connected between said first ATM terminal and said ATM switch, said ATM-LAN connection apparatus comprising:

a first ATM physical layer section connected to said first ATM terminal for receiving as a first reception cell a first ATM cell supplied from said first ATM terminal;

a first AAL5-SAR (ATM Adaptation Layer type 5-Segmentation And Reassembly) section for reassembling said first reception cell into a first AAL5 packet to output said first AAL5 packet as a first LAN emulation frame;

a LAN emulation protocol processing section for processing said first LAN emulation frame into a first processed LAN emulation frame;

a bridging section for converting said first processed LAN emulation frame into a first IP over ATM frame;

an IP over ATM protocol processing section for processing said first IP over ATM frame into a first processed IP over ATM frame;

a second AAL5-SAR section connected to said ATM switch for receiving said first AAL5 packet extracted from said first processed IP over ATM frame to segment said first AAL5 packet into said first ATM cell; and a second ATM physical layer section for transmitting as a first transmission cell said first ATM cell to said ATM switch, said second ATM physical layer section being also for receiving as a second reception cell a second ATM cell supplied from said ATM switch, said second AAL5-SAR section being also for reassembling said second reception cell into a second AAL5 packet to output said second AAL5 packet as a second IP over ATM frame, said IP over ATM protocol processing section being also for processing said second IP over ATM frame into a second processed IP over ATM frame, said bridging section being also for converting second processed IP over ATM frame into a second LAN emulation frame, said LAN emulation protocol processing section being also for processing said second LAN emulation frame into a second processed LAN emulation frame, said first AAL5-SAR section being also for receiving said second AAL5 packet extracted from said IP over ATM frame to segment said second AAL5 packet into said second ATM, and said first ATM physical layer section being also for transmitting as a second transmission cell said second ATM cell to said first ATM terminal.

4. An ATM-LAN as claimed in claim 3, wherein said ATM-LAN connection apparatus further comprises:

a first data table which stores first data to be referred to by said LAN emulation protocol processing section;

a second data table which stores second data to be referred to by said IP over ATM protocol processing section;

said LAN emulation protocol processing section processing said first LAN emulation frame into said first processed LAN emulation frame with reference to said first data table and processing said second LAN emulation frame into said second processed LAN emulation frame with reference to said first data table;

said IP over ATM protocol processing section processing said first IP over ATM frame into said first processed IP over ATM frame with reference to said second data table and processing said second IP over ATM frame into said second processed IP over ATM frame with reference to said second data table.

* * * * *